US012687103B2

(12) United States Patent     (10) Patent No.:   US 12,687,103 B2

Fuller et al.     (45) Date of Patent:     Jul. 21, 2026

(54) CALCIUM CARBONATE COATED TRACERS FOR ASSESSING ACID STIMULATION OPERATIONS IN A HYDROCARBON WELL

(71) Applicant: Chevron U.S.A. Inc., San Ramon, CA (US)

(72) Inventors: Michael James Fuller, Cypress, TX (US); Shannon Kirstin Stocks, Alvin, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 18/714,681

(22) PCT Filed: Dec. 15, 2022

(86) PCT No.: PCT/US2022/081627

§ 371 (c)(1),
(2) Date: May 30, 2024

(87) PCT Pub. No.: WO2023/114893

PCT Pub. Date: Jun. 22, 2023

(65) Prior Publication Data

US 2025/0020054 A1     Jan. 16, 2025

Related U.S. Application Data

(60) Provisional application No. 63/290,096, filed on Dec. 16, 2021.

(51) Int. Cl.
| | |
|---|---|
| *E21B 47/11* | (2012.01) |
| *C09K 8/70* | (2006.01) |
| *E21B 43/27* | (2006.01) |

(52) U.S. Cl.
CPC ................ *E21B 47/11* (2020.05); *C09K 8/70* (2013.01); *E21B 43/27* (2020.05)

(58) Field of Classification Search
CPC ........... E21B 47/11; E21B 43/27; C09K 8/70
See application file for complete search history.

(56) References Cited

U.S. PATENT DOCUMENTS 6,527,051 B1 * 3/2003 Reddy ..................... C09K 8/46
                                         507/224
6,645,769 B2 11/2003 Tayebi
(Continued)

FOREIGN PATENT DOCUMENTS

GB      2586695 A     3/2021

OTHER PUBLICATIONS

Moldoveanu, Nick, "Vertical Source Array in Marine Seismic Exploration", SEG 2000 Expanded Abstracts, 2005, 5 pages.
(Continued)

*Primary Examiner* — Crystal J Lee
(74) *Attorney, Agent, or Firm* — HUNTON ANDREWS KURTH LLP

(57) ABSTRACT

Methods for assessing the effectiveness of an acid stimulation operation in a hydrocarbon well. The methods use encapsulated tracer particles comprising a tracer material that is coated with a calcium carbonate shell. Different encapsulated tracer particles are placed into different portions of a well. A subsequent acid stimulation operation dissolves the calcium carbonate shell and releases the tracer material. The different tracer materials indicate the effectiveness of the acid stimulation operation in different portions of the well.

9 Claims, 5 Drawing Sheets

(56) References Cited

U.S. PATENT DOCUMENTS

| | | | |
|---|---|---|---|
| 6,961,284 B2 | 11/2005 | Moldoveanu | |
| 9,359,886 B2 | 6/2016 | Cameron | |
| 9,410,934 B2 | 8/2016 | Robinson | |
| 10,017,684 B2 | 7/2018 | Rule | |
| 10,961,444 B1 | 3/2021 | Bestaoui-Spurr | |
| 2010/0307745 A1* | 12/2010 | Lafitte | E21B 47/11 |
| | | | 166/250.12 |
| 2012/0012326 A1 | 1/2012 | Darby | |
| 2015/0041121 A1 | 2/2015 | Hunt et al. | |
| 2015/0377010 A1 | 12/2015 | Matherly | |
| 2016/0168960 A1 | 6/2016 | Wetzel, Jr. | |
| 2016/0215207 A1 | 7/2016 | Maeda | |
| 2016/0333258 A1 | 11/2016 | Drake | |
| 2017/0267915 A1 | 9/2017 | Volk | |

OTHER PUBLICATIONS

Moldoveanu, et al., "Over/under towed streamer acquisition: A method to extend seismic bandwidth to both higher and lower frequencies", The Leading Edge, Jan. 2007, 14 pages.

Acid fracturing, Jan. 27, 2025; Society of Petroleum Engineers (SPE) _ OnePetro.

Measuring _ definition in the Cambridge English Dictionary.

Measure verb—Definition, pictures, pronunciation and usage notes _ Oxford.com.

Jew et al., "Chemical and Reactive Transport Processes Associated with Hydraulic Fracturing of Unconventional Oil/Gas Shales", Chem Rev 2022, 122, 9198-9263.

International Search Report and Written Opinion for PCT/US2022/081627 dated May 17, 2023.

https:/glossary.slb.com/en/terms/g/gravel_pack , 2005, 2 pages.

\* cited by examiner

CALCIUM CARBONATE COATED TRACERS FOR ASSESSING ACID STIMULATION OPERATIONS IN A HYDROCARBON WELL

RELATED APPLICATIONS

The present application is a national phase application of PCT/US2022/081627 filed Dec. 15, 2022, which application claims priority to U.S. Provisional Patent Application No. 63/290,096 filed Dec. 16, 2021. The entire contents of the foregoing applications are incorporated herein by reference.

TECHNICAL FIELD

Embodiments of the technology relate generally to using calcium carbonate coated tracers for measuring the effectiveness of acid stimulation in a hydrocarbon well.

BACKGROUND

Wells are drilled into land and subsea formations in order to produce resources such as water and hydrocarbons (e.g. petroleum and natural gas). In some cases, various techniques are applied to formations to open or enlarge passages in the formation to facilitate the extraction of hydrocarbons. One example of these techniques, which is performed during well completion, is hydraulic fracturing in which proppant is pumped into fractures in the formation. Another technique is acid stimulation. Acid stimulation is often performed on a well at the later stages of the well's productive life when productivity has begun to decline. In the acid stimulation process, an acidic composition is pumped into a well to dissolve materials such as limestone, dolomite, and sand within the porosity of the formation or within the porosity of proppant/gravel packs in the well completion. Dissolving these materials opens or enlarges the passages in the formation to stimulate the flow of hydrocarbons. The capacity to accurately assess the effectiveness of an acid stimulation operation can assist in optimizing the productive life of the well.

SUMMARY

Generally, the techniques described herein can be applied to a variety of situations in which proppant or gravel is introduced into a well. As will be illustrated further in the following disclosure, the embodiments described herein can be applied to introduce coated tracers in multi-stage hydraulic fracturing, in single stage hydraulic fracturing, and in open hole gravel packs.

In one example embodiment, the present disclosure is generally directed to a method of assessing acid stimulation of a hydrocarbon well. The method can comprise pumping a first fracturing slurry comprising first encapsulated tracer particles into a first annular pack of a first fracturing stage in the hydrocarbon well, wherein the first encapsulated tracer particles comprise a first tracer coated with calcium carbonate; pumping a second fracturing slurry comprising second encapsulated tracer particles into a second annular pack of a second fracturing stage in the hydrocarbon well, wherein the second encapsulated tracer particles comprise a second tracer coated with calcium carbonate; at a time subsequent to pumping the first fracturing slurry and the second fracturing slurry into the hydrocarbon well, pumping an acid solution into the hydrocarbon well; and measuring an amount of the first tracer and the second tracer in a retrieved fluid from the hydrocarbon well. The foregoing method can further include one or more of the following aspects.

In the foregoing method, the acid solution can dissolve the calcium carbonate coating the first tracer and the calcium carbonate coating the second tracer. In the foregoing method, the first annular pack of the first fracturing stage can access and be located adjacent a first zone of the hydrocarbon well and the second annular pack of the second fracturing stage can access and be located adjacent a second zone of the hydrocarbon well. In the foregoing method, the first encapsulated tracer particles can have an average diameter of greater than zero and less than 3 mm and the second encapsulated tracer particles can have an average diameter of greater than zero and less than 3 mm. In the foregoing method, the first encapsulated tracer particles can have an average diameter of greater than zero and less than 1 mm and the second encapsulated tracer particles can have an average diameter of greater than zero and less than 1 mm. In the foregoing method, the first fracturing slurry and the second fracturing slurry can further comprise proppant particles having an average diameter greater than zero and less than 3 mm. In the foregoing method, the first fracturing slurry and the second fracturing slurry can further comprise proppant particles having an average diameter greater than zero and less than 1 mm. In the foregoing method, a concentration of the first encapsulated tracer particles as a percentage by weight of total solids in the first fracturing slurry can be less than 10% and a concentration of the second encapsulated tracer particles as a percentage by weight of total solids in the second fracturing slurry can be less than 10%.

In another example embodiment, the present disclosure is directed to a method of assessing acid stimulation of a hydrocarbon well. The method can comprise: pumping a first phase of a fracturing slurry of a fracture stage comprising first encapsulated tracer particles into a formation zone of the hydrocarbon well, wherein the first encapsulated tracer particles comprise a first tracer coated with calcium carbonate; pumping a second phase of the fracturing slurry of the fracture stage comprising second encapsulated tracer particles into the formation zone of the hydrocarbon well, wherein the second encapsulated tracer particles comprise a second tracer coated with calcium carbonate; at a subsequent time after pumping the first phase of the fracturing slurry and the second phase of the fracturing slurry into the formation zone, pumping an acid solution into the hydrocarbon well; and measuring an amount of the first tracer and the second tracer in a produced fluid from the formation zone of the hydrocarbon well. The foregoing method can further include one or more of the following aspects.

In the foregoing method, the acid solution can dissolve the calcium carbonate coating the first tracer and the calcium carbonate coating the second tracer. In the foregoing method, the first encapsulated tracer particles are located at a deeper position in the formation zone than the second encapsulated tracer particles. In the foregoing method, the first encapsulated tracer particles and the second encapsulated tracer particles have an average diameter greater than zero and less than 3 mm. In the foregoing method, the fracturing slurry further comprises proppant particles having an average diameter greater than zero and less than 3 mm. In the foregoing method, the first encapsulated tracer particles and the second encapsulated tracer particles have an average diameter greater than zero and less than 1 mm. In the foregoing method, the fracturing slurry further comprises proppant particles having an average diameter greater than zero and less than 1 mm. In the foregoing method, a concentration of the first encapsulated tracer particles as a percentage by weight of total solids in the first stage of the fracturing slurry is greater than 0% and less than 10%; and a concentration of the second encapsulated tracer particles as a percentage by weight of total solids in the second stage of the fracturing slurry is greater than 0% and less than 10%.

In another example embodiment, the present disclosure is directed to a method of assessing an acid stimulation of a horizontal portion of a hydrocarbon well. The method can comprise: pumping a first gravel slurry comprising first encapsulated tracer particles into a first phase of a gravel pack in the hydrocarbon well, the first phase of the gravel pack located proximate a heel of the horizontal portion of the hydrocarbon well, wherein the first encapsulated tracer particles comprise a first tracer coated with calcium carbonate; pumping a second gravel slurry comprising second encapsulated tracer particles into a second phase of the gravel pack in the hydrocarbon well, the second phase of the gravel pack located farther from the heel of the horizontal portion of the hydrocarbon well than the first phase of the gravel pack, wherein the second encapsulated tracer particles comprise a second tracer coated with calcium carbonate; at a subsequent time after pumping the first gravel slurry and the second gravel slurry, pumping an acid solution into the hydrocarbon well; and measuring an amount of the first tracer and the second tracer in a produced fluid from the hydrocarbon well. The foregoing method can further include one or more of the following aspects.

In the foregoing method, the produced fluid comprises the first tracer from the first phase of the gravel pack located at a first measured depth of the hydrocarbon well and the second tracer from the second phase of the gravel pack located at a second measured depth of the hydrocarbon well. In the foregoing method, the first encapsulated tracer particles and the second encapsulated tracer particles have an average diameter greater than zero and less than 3 mm. In the foregoing method, a concentration of the first encapsulated tracer particles as a percentage by weight of total solids in the first gravel slurry is greater than 0% and less than 10%; and a concentration of the second encapsulated tracer particles as a percentage by weight of total solids in the second gravel slurry is greater than 0% and less than 10%.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments relating to calcium carbonate coated tracers used in assessing acid stimulation operations in a wellbore and therefore are not to be considered limiting of the scope of this disclosure. The principles illustrated in the example embodiments of the drawings can be applied to alternate methods and apparatus. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements.

DETAILED DESCRIPTION OF EXAMPLE EMBODIMENTS

Figures 1, 2:
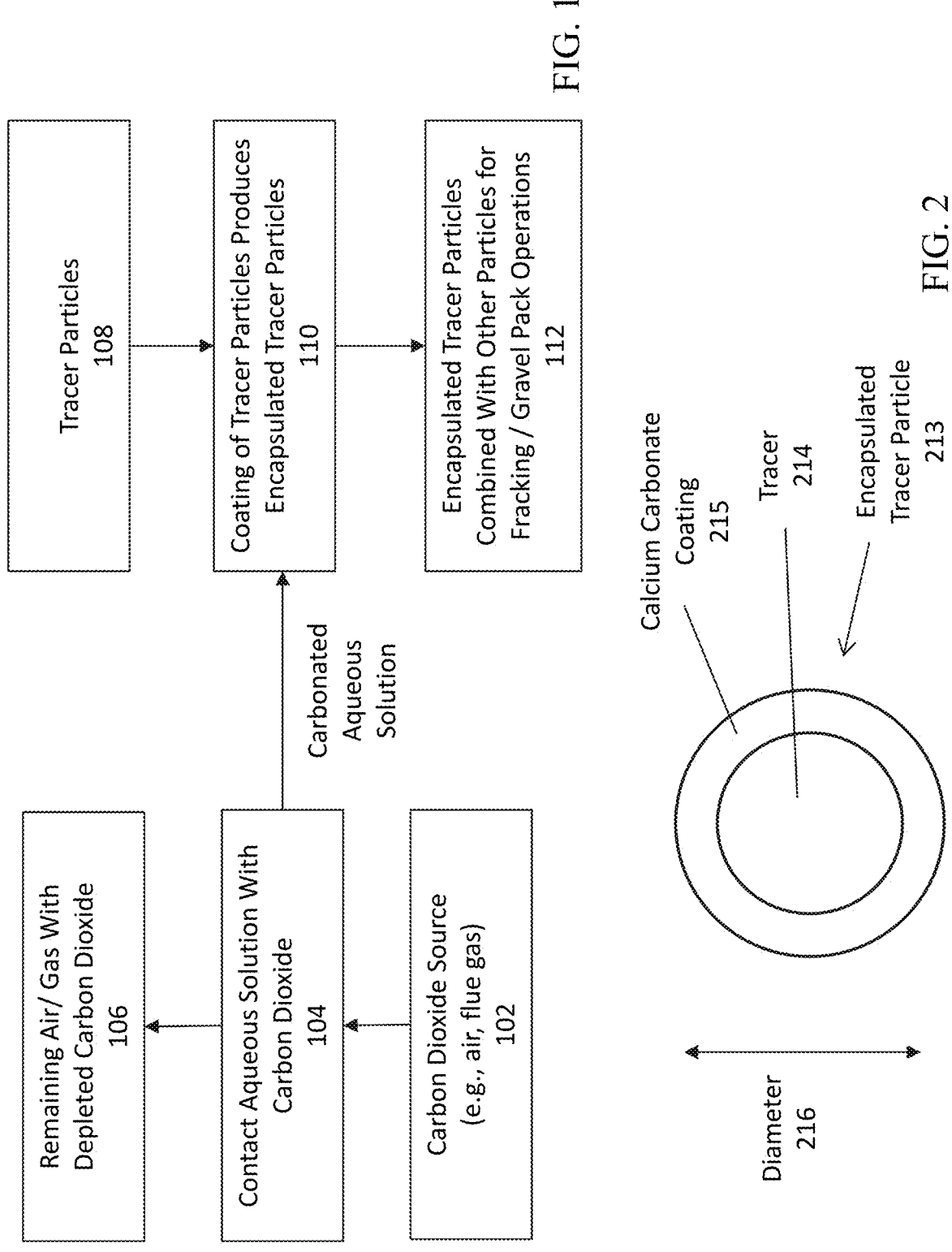
FIG. 1 illustrates a method of producing encapsulated tracer particles in accordance with an example embodiment of the disclosure.
FIG. 2 illustrates an encapsulated tracer particle in accordance with an example embodiment of the disclosure.

The example embodiments discussed herein are directed to systems and methods for using encapsulated tracer particles to assess the effectiveness of acid stimulation operations in a wellbore. Conventional approaches to quantifying effective acid stimulation of producer and injector wells is currently performed by measuring the incremental change in productivity or injectivity following the acid treatment operation. However, the effectiveness of acid diversion or placement in the formation, namely the zonal distribution of injected acids across an entire interval height, is generally unknown after the treatment. Limited methods are available to check the zonal distribution of acid injection, the most common of which involves using downhole temperature sensing to monitor temperature changes along an interval height using fiberoptics installed along the length of coiled tubing that is used to inject the acid. The areas of greatest change in temperature along the interval of the well indicate the zones of highest injectivity of the acid solution. With the use of acid diverters, at the locations and depths of highest acid injection real-time temperature changes can be observed, indicating the effectiveness of the diverter. However, using coiled tubing for injecting the acid solution and for downhole temperature sensing across the zones of interest along a well interval is often infeasible based on logistical and well conditions. For example, using coiled tubing is often infeasible in horizontal wells and in deepwater wells. Accordingly, it is often difficult to control the precise placement of acid solution at various zones along a target interval or pay zone of the well.

By comparison, methods exist to assess the zonal contribution to production of different zones/depths of a reservoir following initial completion using dissolvable chemical tracers. These chemical tracers are deployed as part of the initial completion (specifically in completions using sand control screens), with different, unique and identifiable tracers installed across zones of different depths in the well. As production occurs, the tracers begin to dissolve in the produced fluids and are transported to the surface where they can be measured quantitatively. The relative concentrations of the different tracers (specific to different intervals) in the produced fluids will indicate the relative contributions of those intervals to the overall production rates. However, these methods are only suitable for assessing early-life production due to both the rapid solubility of the tracers and due to the need to install these tracers as part of the initial completion. Further, no such similar technology exists for using soluble tracers to assess the effectiveness of an acid treatment for stimulation. In particular, no technology exists for using soluble tracers to assess the effectiveness of an acid treatment for remedial stimulation of a well at a point later in the well's productive life when productivity has declined.

One advantage of the encapsulated tracer particles described herein is that the encapsulated tracer particles can be placed in the well with a gravel pack, a fracturing pack, or in a fracturing slurry and remain in the well in an inert state for an extended period of time, such as months or years, during the productive life of the well. At a later point in the life of productive well, such as months or years later when the well's productivity begins to decline, an acid stimulation operation can be performed on the well to improve production. When the previously placed encapsulated tracer particles encounter the acid solution from the acid stimulation operation, the calcium carbonate shell can dissolve. Once the calcium carbonate shell is dissolved, the tracer that had been contained within the shell is released and travels to the surface with produced fluid from the well. The tracer can be used to determine the extent to which the acid solution penetrated the various zones of the well.

While not a requirement, in some example embodiments, the calcium carbonate shell of the particles can be created using carbon dioxide originally captured from the environment or from industrial releases, thereby sequestering carbon dioxide in the shell of the particles. Using carbon dioxide to create the calcium carbonate reduces the economic and environment costs associated with mining, transporting, and preparing naturally occurring calcium carbonate for use in a well. Additionally, sequestering carbon dioxide from the environment or from industrial processes in the calcium carbonate shell can reduce the overall volume of carbon dioxide in the environment, at least until such time that the calcium carbonate shell of encapsulated tracer particles is dissolved when exposed to the acid solution. Accordingly, creating the calcium carbonate shell using sequestered carbon dioxide can provide additional advantages.

As used herein, the terms "sequestered carbon dioxide" and "captured carbon dioxide" refer to the process of gathering carbon dioxide from the atmosphere or directly from a combustion process, combining the carbon dioxide with an aqueous solution, and producing calcium carbonate that traps the carbon dioxide in a solid compound.

Given the foregoing benefits, using encapsulated tracer particles for assessing the effectiveness of an acid stimulation operation in a well can provide several advantages. As will be described further in the following examples, the methods and apparatus described herein improve upon prior art approaches to assessing the effectiveness of acid stimulation operations in hydrocarbon wells.

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

The application of the calcium carbonate coating to the tracer to form the encapsulated tracer particles would typically occur at a manufacturing facility that is off-site from the well. Application of the calcium carbonate coating to the tracer to form the encapsulated tracer particles can occur through a variety of processes. FIG. 1 illustrates one example method 100 for creating encapsulated tracer particles. While method 100 describes forming calcium carbonate from sequestered carbon dioxide extracted from the environment, in other embodiments, the calcium carbonate coating of the encapsulated tracer particles can be formed from other processes. Accordingly, method 100 should be viewed as illustrative of one example method of forming a calcium carbonate coating of the encapsulated tracer particles and not limiting of other processes within the scope of this disclosure.

In step 102 of example method 100, a source of carbon dioxide is gathered for use in the method 100. The source of carbon dioxide can be air from the atmosphere, flue gas from the burning of a hydrocarbon, or other industrial sources or emissions. In step 104, the carbon dioxide source is contacted with an aqueous solution containing calcium ions. While the carbon dioxide source in step 102 is typically in gas form such as air or flue gas, it should be understood that the state of the carbon dioxide can be modified for the purpose of contacting with the aqueous solution. For example, the carbon dioxide brought into contact with the aqueous solution can be in the state of a gas, a liquid, a solid, or a mixture of one of these states. The carbon dioxide source can be brought into contact with the aqueous solution by bubbling carbon dioxide gas through the aqueous solution or by mixing solid or liquid forms of the carbon dioxide with the fluid flow of the aqueous solution. The carbon dioxide reacts with the aqueous solution and produces carbonic acid, bicarbonate ions, and carbonate ions. The presence of calcium ions in the aqueous solution allows for a greater concentration of the carbon dioxide to be sequestered. It should be understood that in alternate embodiments, other divalent cations such as magnesium ions, can be included in the aqueous solution. After the carbon dioxide is contacted with the aqueous solution, the remaining carbon dioxide source gas, which has now been depleted of the carbon dioxide absorbed in step 104, is discharged in step 106 having less carbon dioxide than when it was the original source gas in step 102. Thus, step 104 removes carbon dioxide from the carbon dioxide source and discharges a depleted carbon dioxide gas in step 106.

In step 108, substrate particles are gathered for use in sequestering the carbon dioxide absorbed into the aqueous solution. The substrate particles can be any of a variety of particles that can serve as a tracer. A tracer typically is a distinctive element or chemical that can be detected in a fluid retrieved from a well and used to determine information associated with the flow of fluids from the well. For example, a rate at which a tracer is detected in a fluid retrieved at the surface of the well can indicate a rate of flow of the fluid in the well. As another example, a tracer can identify fluid flow from a particular zone of the well. In step 108, the substrate particle, or tracer, typically is a micronized solid to facilitate formation of the calcium carbonate coating thereon. The tracer particles are coated, in step 110, with a calcium carbonate coating containing sequestered carbon dioxide to form the encapsulated tracer particles.

Referring to step 110, the tracer particles are submerged in the aqueous solution containing carbonates from step 104. While the tracer particles are submerged in the aqueous solution, calcium carbonate compositions precipitate and form a coating of calcium carbonate on the exterior of the tracer particles. The precipitation of the calcium carbonate compositions can be controlled in various ways, including, for example, controlling the temperature of the aqueous solution so that it is in the range of 5 to 70 degrees C. In other examples, other properties of the aqueous solution that can be controlled in order to control precipitation include adjusting the pH of the aqueous solution so that it is in the range of 9 to 14. The result of step 110 is a collection of encapsulated tracer particles that are coated with calcium carbonate. As will be described further below, process 100 can be repeated to produce encapsulated tracer particles with uniquely identifiable tracers that can be used in different intervals, zones, stages or portions of a well.

In step 112 of FIG. 1, the encapsulated tracer particles produced in step 110 can be combined with other particles for a desired operation. As one example, the encapsulated tracer particles can be combined with gravel particles for a gravel pack. In another example, the encapsulated tracer particles can be combined with other proppant particles in a fracturing pack. In yet another example, the encapsulated tracer particles can be combined with proppant particles in a fracturing slurry that is pumped into a gravel pack or fracturing pack positioned in a well. Thus, the encapsulated tracer particles provide an inert tracer that can be positioned within a well and later released during an acid stimulation operation.

It should be understood that the example method 100 of FIG. 1 can be modified within the scope of this disclosure. For example, certain steps of method 100 may be altered. Moreover, additional steps may be added in sequence or in parallel to the method 100.

FIG. 2 provides a cross-sectional illustration of an encapsulated tracer particle 213 in accordance with the example embodiments of this disclosure. The encapsulated tracer particle 213 can be produced using method 100 of FIG. 1. Alternatively, the encapsulated tracer particle 213 can be produced using other methods for applying a calcium carbonate coating to the tracer that do not involve capturing carbon dioxide from the environment and using the captured carbon dioxide to create the calcium carbonate.

FIG. 2 shows the tracer 214 and the outer calcium carbonate coating 215. The calcium carbonate forms a hard shell around the tracer. The calcium carbonate coating is preferably non-porous so that the tracer does not leak from the encapsulated tracer particle 213. Although the calcium carbonate coating of the encapsulated tracer particle may have a lower hardness than traditional proppant such as sand, it should be sufficiently strong to withstand the mechanical stress of being pumped into the well. In other embodiments, additional coatings could be applied to the calcium carbonate coating to enhance the strength of the encapsulated tracer particle as long as the additional coatings are acid soluble.

The encapsulated tracer particle 213 has a diameter 216. The diameter of the encapsulated tracer particles can have a size appropriate for use in a gravel pack, a fracturing pack, or a fracturing operation. In other words, the encapsulated tracer particles can have a size comparable to the gravel or sand particles with which they are combined. In certain example embodiments, the encapsulated tracer particles have an average diameter of greater than zero and less than 3 mm. In other example embodiments, the encapsulated tracer particles have an average diameter of greater than zero and less than 1 mm.

The concentration of the encapsulated tracer particles also can be controlled for the particular application. When the acid solution dissolves the calcium carbonate shell of the encapsulated tracer particles and releases the tracer, a void remains in the gravel pack, frac pack, or portion of the formation where the encapsulated tracer particle was located. Because excessive voids can negatively impact the function of the gravel pack or frac pack, the concentration of encapsulated tracer particles (relative to the total volume of particles) in the fracturing slurry should be controlled. As examples, the concentration of encapsulated tracer particles as a percentage by weight of total solids in the fracturing slurry that is pumped into the well can be less than 10%, and preferably less than 5%, and more preferably less than 3%.

The tracer 214 can be a particle, as referenced in the example of FIG. 1, or in other example embodiments the tracer 214 can be a liquid solution. In certain embodiments, the tracer 214 can be a soluble material, whereas in other embodiments, the tracer 214 can be an insoluble material.

In the case of a soluble, either liquid or solid, tracer 214, the soluble tracer is released from the encapsulated tracer particle 213 located in the well when an acid solution from an acid stimulation operation dissolves the calcium carbonate coating 215. The calcium carbonate coating 215 and the tracer 214 are dissolved into a retrieved fluid from the well. The retrieved fluid can be the spent acid flowback fluids from the acid stimulation operation. Alternatively, the retrieved fluid can be the produced fluids (water and/or hydrocarbon) from the reservoir in which the well is located. Once the retrieved fluid is at the surface, samples of the flowback or produced fluids can be analyzed for the relative concentrations of different tracer identities, or the recovery of the multiple tracers as a function of time during flowback. In other words, encapsulated tracer particles containing different tracers can be placed at different locations in the well in order to provide an indication of the effectiveness of the acid stimulation operation along the entire producing interval. Advantages with the use of a soluble tracer, in contrast to the insoluble tracer approach described below, are a) numerous individual chemical identities can be feasibly used as soluble chemical tracers (due to a larger variety of soluble tracers versus solid tracers) and b) the detection and measurement of the concentrations of dissolved soluble tracers in a fluid retrieved from a well is relatively straightforward.

In the case of an insoluble solid tracer 214, the calcium carbonate coating 215 would dissolve when encountering the acid solution from the acid stimulation operation and the insoluble solid tracer would be returned to the surface in a retrieved fluid from the well. The retrieved fluid can be the spent acid flowback fluids from the acid stimulation operation. Alternatively, the retrieved fluid can be the produced fluids (water and/or hydrocarbon) from the reservoir in which the well is located. The insoluble solid tracer returned to the surface can comprise a single intact core particle, or an agglomeration of smaller solid tracer particles. However, the size of the solid tracer released from the dissolved calcium carbonate shell must be designed to be small enough to be produced through the gravel pack pore throats and screen apertures located in the well completion without plugging or bridging them. Once the insoluble solid tracer particles are produced to the surface, their concentration and the relative concentrations of multiple solid tracers can be measured either through in-line detectors or through other means to analyze the tracer concentrations. One advantage with the use of an insoluble solid tracer is the reduced risk of premature leaching from porous or compromised calcium carbonate shells prior to the acid stimulation operation. An additional advantage with insoluble solid tracers is the comparative simplicity to encapsulate these solid materials with calcium carbonate in contrast to coating a soluble tracer.

Figure 3:
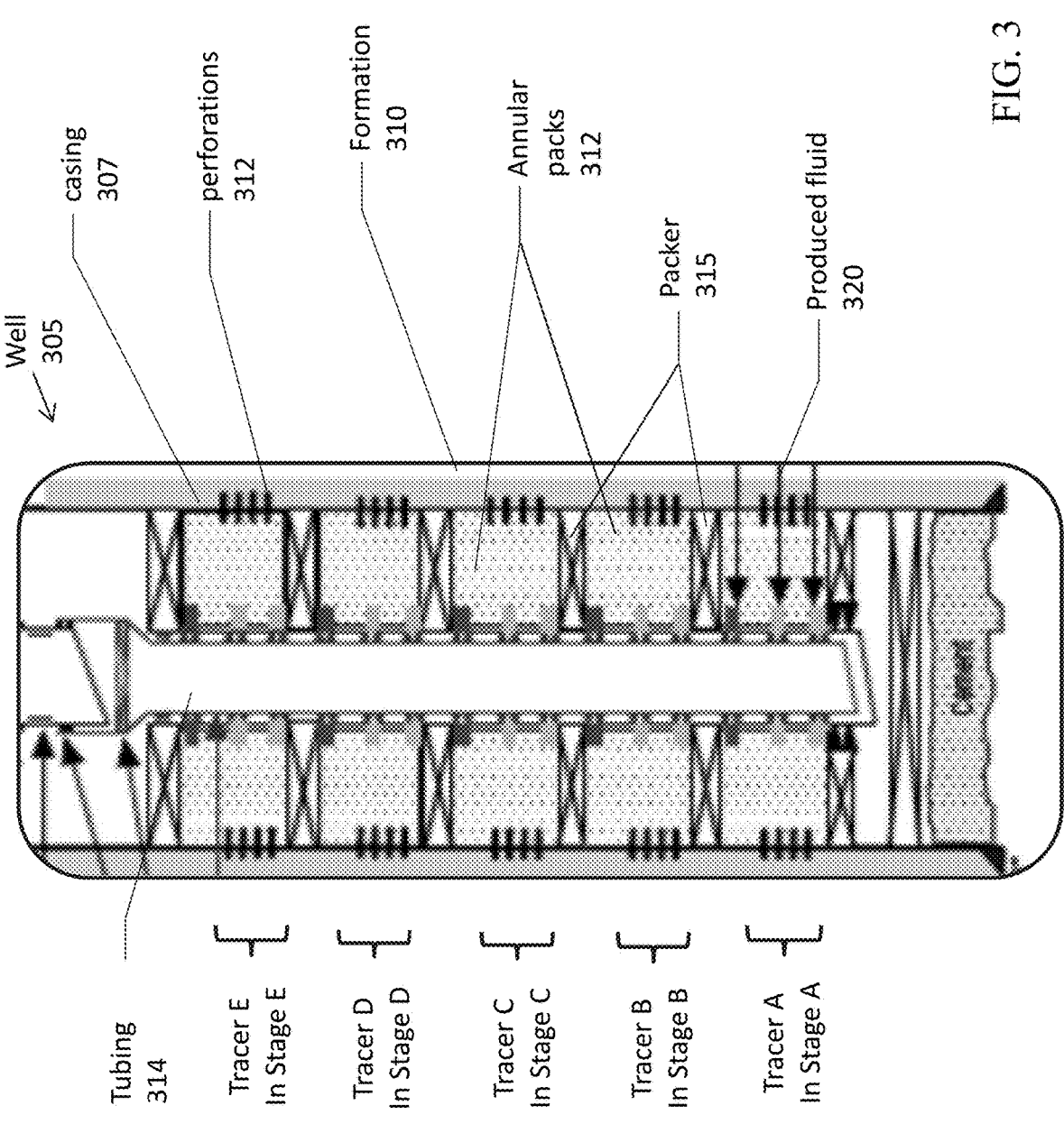
FIG. 3 illustrates a portion of a wellbore with multiple fracturing packs, each of which comprises distinct encapsulated tracer particles, in accordance with an example embodiment of the disclosure.
Figure 4:
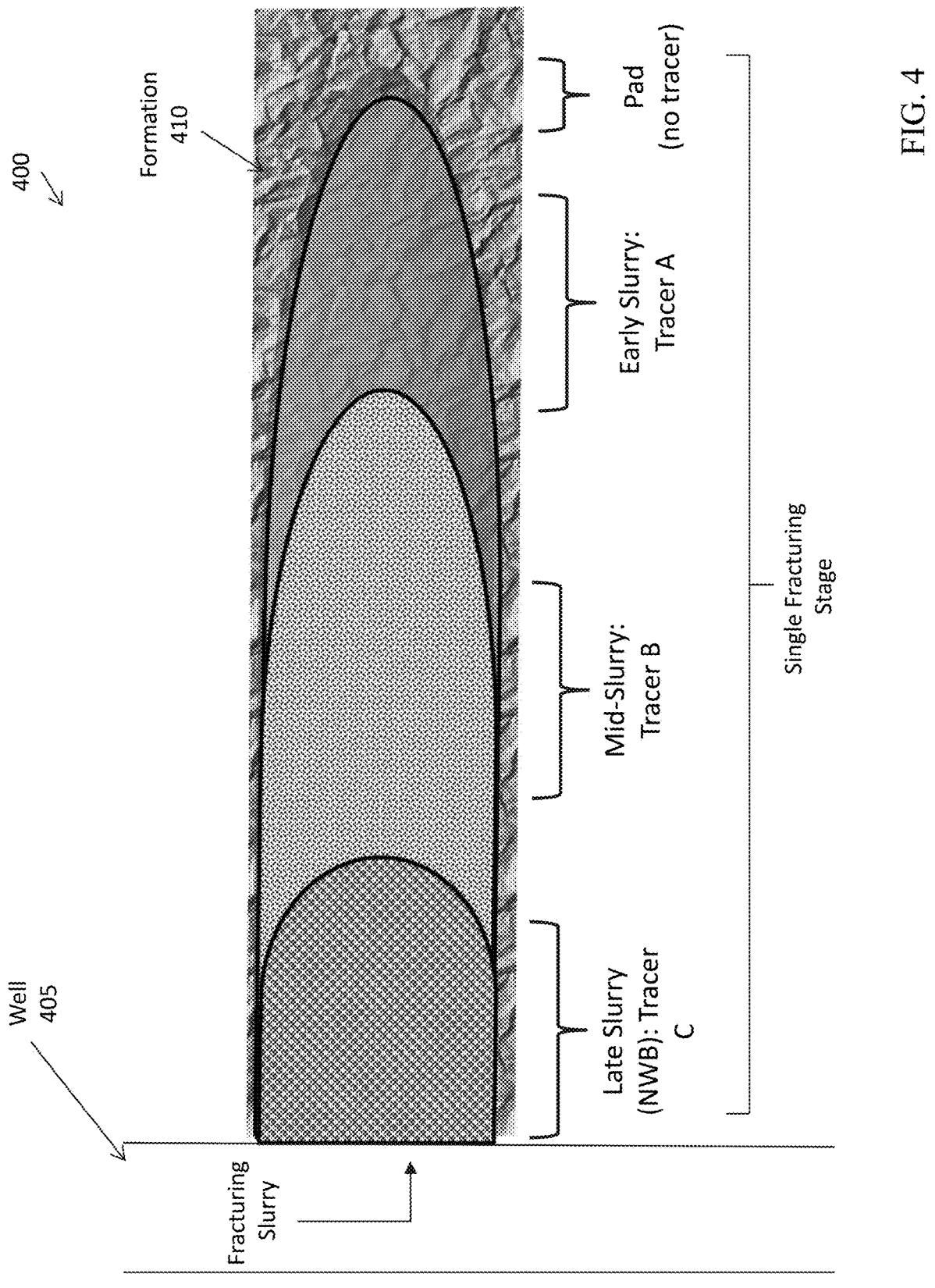
FIG. 4 illustrates a portion of a wellbore and a fractured zone of a formation in which at least two types of encapsulated tracer particles are deployed in sequence in accordance with an example embodiment of the disclosure.
Figure 5:
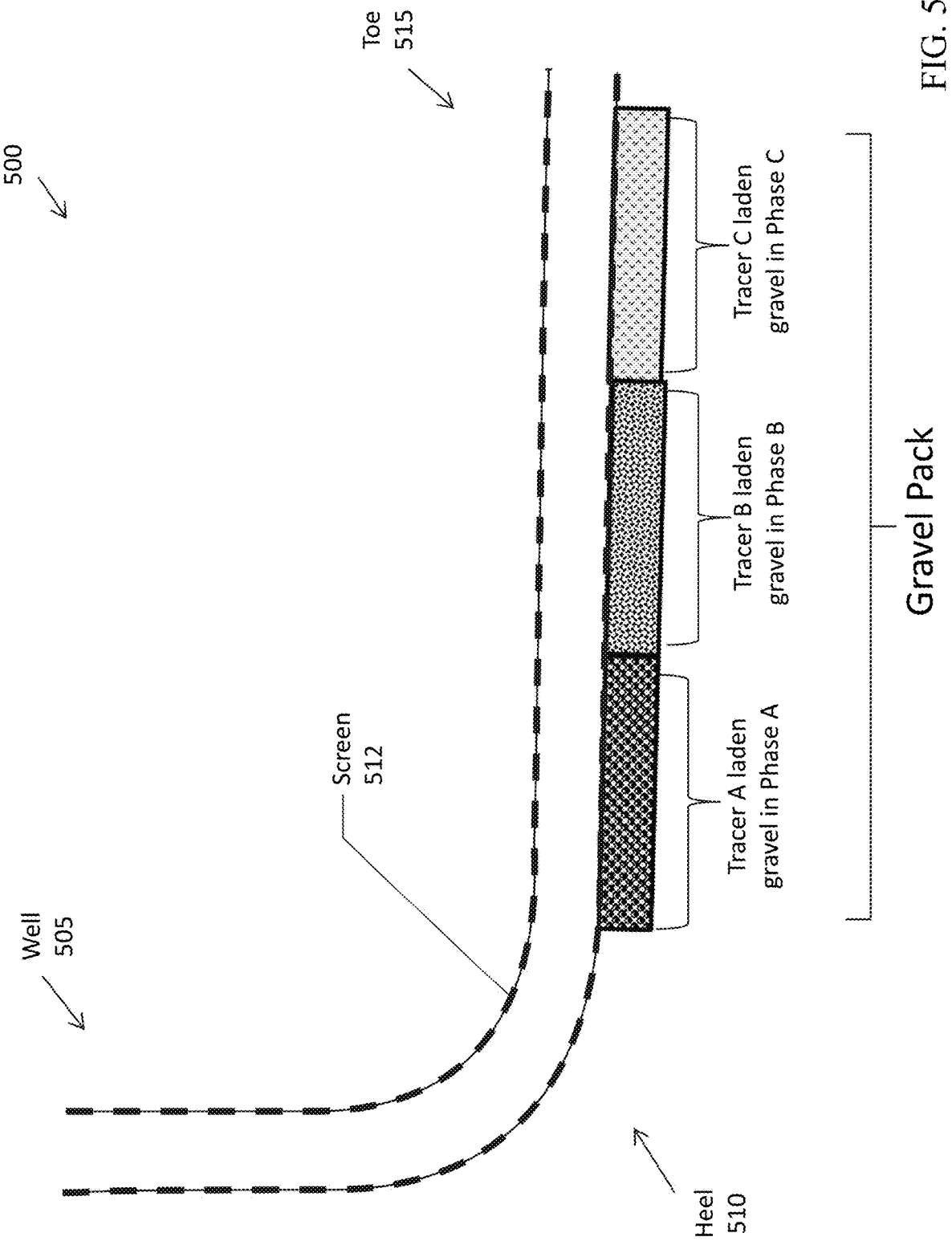
FIG. 5 illustrates a wellbore in which a series of distinct encapsulated tracer particles are deployed in a sequence of phases of a gravel pack along an interval length of the wellbore in accordance with an example embodiment of the disclosure.

FIGS. 3-5 illustrate three examples in which the previously described encapsulated tracer particles can be used to assess the effectiveness of an acid stimulation operation. More generally, the methods described herein can be used to assess acid placement effectiveness in any completion that involves injection of solids such as proppants or gravel. This includes completions such as hydraulic fracturing, cased hole frac pack (CHFP), open hole gravel pack (OHGP), and cased hole gravel pack (CHGP) completions.

Completions that are particularly well-suited for the embodiments herein are those with annular packs placed around a sand control screen. Acid stimulation operations are often used in these types of completions and assessing the effectiveness of acid placement can be challenging due to the limited feasibility of using coiled tubing with downhole temperature sensing in those well conditions.

The embodiments disclosed herein can be used in multistage fracturing to confirm which frac stages are being stimulated by acid. With respect to a single fracture stage, the disclosed embodiments can be used to assess acid depth of penetration into the fracture stage or frac-pack completion through staging of multiple unique tracers from early through late slurry phases of the fracturing operation.

The embodiments disclosed herein can apply to acid stimulation effectiveness in either infant-well (early-life) acid stimulation or a remedial stimulation treatment in an older well.

Referring now to FIG. 3, a cross-section of a well system 300 is illustrated. Well system 300 can be located on land or could be a deepwater well where assessing the effectiveness of an acid stimulation operation is typically challenging. Well system 300 comprises a hydrocarbon well 305 located in a formation 310 that comprises a hydrocarbon reservoir (not shown). The well 305 comprises a casing 307 and multiple annular packs 312 positioned between multiple packers 315. The annular packs 312 are positioned adjacent to perforations 312 in the casing 307 which are aligned with zones of the formation 310. While the example well system of FIG. 3 illustrates five fracturing stages labeled A through E with corresponding annular packs 312, it should be understood that alternate embodiments may have as few as two fracturing stages or more than five fracturing stages.

Encapsulated tracer particles such as those previously described can be placed within the hydrocarbon well 305 during the initial completion of the well. Specifically, different encapsulated tracer particles are injected into each fracturing stage. The encapsulated tracer particles can be injected with conventional proppant in a slurry through the entire treatment of the well so that the proppant and encapsulated tracer particles are positioned in the annular packs as well as the adjacent hydraulic fractures in the formation. Alternatively, the encapsulated tracer particles can be injected in the slurry only in the later stages of the treatment so that the encapsulated tracer particles are positioned closest to the screen or wellbore.

As illustrated in FIG. 3, encapsulated tracer particles comprising tracer A would be pumped into the well and into annular pack A of fracturing stage A, encapsulated tracer particles comprising tracer B would be pumped into the well and into annular pack B of fracturing stage B, and so forth up to the encapsulated tracer particles comprising tracer E pumped into the well and into annular pack E of fracturing stage E. Each of the tracers, A, B, C, D, and E, can be distinct so that they provide an indication of acid stimulation for each respective fracturing stage when they are produced to the surface at a later time. The encapsulated tracer particles can remain in the well 305 within each annular pack, and optionally within the hydraulic fracture in the formation surrounding each annular pack, in an inert condition until an acid stimulation operation is performed at a later time in the productive life of the well.

At a later point in time, an acid stimulation operation can be performed on hydrocarbon well 305. In connection with the acid stimulation operation, an acid solution is injected into the well to stimulate fractures or openings in the formation 310. The acid solution dissolves the calcium carbonate coating on the encapsulated tracer particles thereby releasing tracers A, B, C, D, and E. A retrieved fluid, either acid flowback fluids or produced water or oil from the formation, brings the tracers to the surface. At the surface, the quantities of each of tracers A, B, C, D, and E can be measured to assess the extent to which the acid penetrated each zone of the well. The information gathered from analyzing the quantities of the tracers in the retrieved fluids can be used in further well operations. For example, if the analysis shows a smaller amount of tracers A and B than tracers D and E, this indicates the acid solution had greater penetration into frac-packs at stages D and E relative to frac-packs at stages A and B. The analysis can be used for further remedial operations focusing on frac-packs at stages A and B.

Referring now to FIG. 4, a cross-section of a well system 400 is illustrated. The well system 400 comprises a hydrocarbon well 405 located in a formation 410. To simplify the illustration, only a portion of the formation 410 is shown in FIG. 4. In the well system 400, a fracturing operation is illustrated in which the fracturing operation has a sequence of different pad and slurry phases that are pumped as part of a single fracturing stage into a formation zone. An early phase of the fracturing slurry is pumped into the formation zone and comprises encapsulated tracer particles containing tracer A. The early phase of the fracturing slurry penetrates deeper into the formation zone than later phases of the fracturing slurry. Following the early phase, a mid-phase of the fracturing slurry is pumped into the formation zone, the mid-phase comprising encapsulated tracer particles containing tracer B. After the mid-phase, a late phase of the fracturing slurry is pumped into the formation zone, the late phase comprising encapsulated tracer particles containing tracer C. Because the encapsulated tracer particles containing tracer C were the last pumped into the formation zone, they are deposited nearest the wellbore of hydrocarbon well 405.

Tracer A, tracer B, and tracer C can each comprise a different tracer material. When acid solution from an acid stimulation operation is applied to the formation zone, fluid is retrieved from well 405 in the form of flowback acid or production fluids. The retrieved fluid can contain concentrations of tracer A, B, and C. The concentration level of tracers A, B, and C present in the retrieved fluid will indicate the extent to which the acid solution penetrated the formation zone thereby providing an indication of the effectiveness of the acid stimulation operation. It should be understood that in alternate embodiments of the example well system 400 fewer or greater slurry phases can be used in the same fracture stage wherein each phase comprises a unique tracer.

Referring now to FIG. 5, a cross-section of a well system 500 is illustrated. Well system 500 comprises a hydrocarbon well 505 that includes a horizontal well portion in which a gravel pack has been placed. Hydrocarbon well 505 can be drilled as an open hole well. As illustrated in FIG. 5, the gravel pack is positioned around the outer side of a screen 512. In the example of FIG. 5, gravel containing tracer A is placed at phase A closest to the heel 510, gravel containing tracer B is placed at phase B, and gravel containing tracer C is placed at phase C closest to the toe 515. The locations of the different phases of the gravel can be estimated based on the simulated deposition of gravel along the wellbore of the well 505. Gravel portions A, B, and C would be placed in the well 505 by sequentially pumping distinct gravel slurries containing the distinct tracers into the well 505.

The gravel slurry pumped to each of gravel phases A, B, and C comprises a carrier fluid which contains gravel particles and encapsulated tracer particles. The encapsulated tracer particles can be similar to the examples previously described in that they include an inner tracer material that is coated with a calcium carbonate shell. To distinguish each of zones A, B, and C, unique tracers can be included in each phase of the gravel slurry. Tracer A can be included in the gravel slurry pumped to zone A, tracer B can be included in the gravel slurry pumped to zone B, and tracer C can be included in the gravel slurry pumped to zone C.

When acid solution from an acid stimulation operation is applied to the horizontal portion of well 505, fluid is retrieved from well 505 in the form of flowback acid or production fluids. The retrieved fluid can contain concentrations of tracer A, B, and C. The concentration level of tracers A, B, and C present in the retrieved fluid will indicate the extent to which the acid solution penetrated the sequential zones of well 505 thereby providing an indication of the effectiveness of the acid stimulation operation at different measured depths of the well. It should be understood that in alternate embodiments of the example well system 500 fewer or greater phases of gravel slurry can be used wherein each gravel pack phase comprises a unique tracer.

Figure 6:
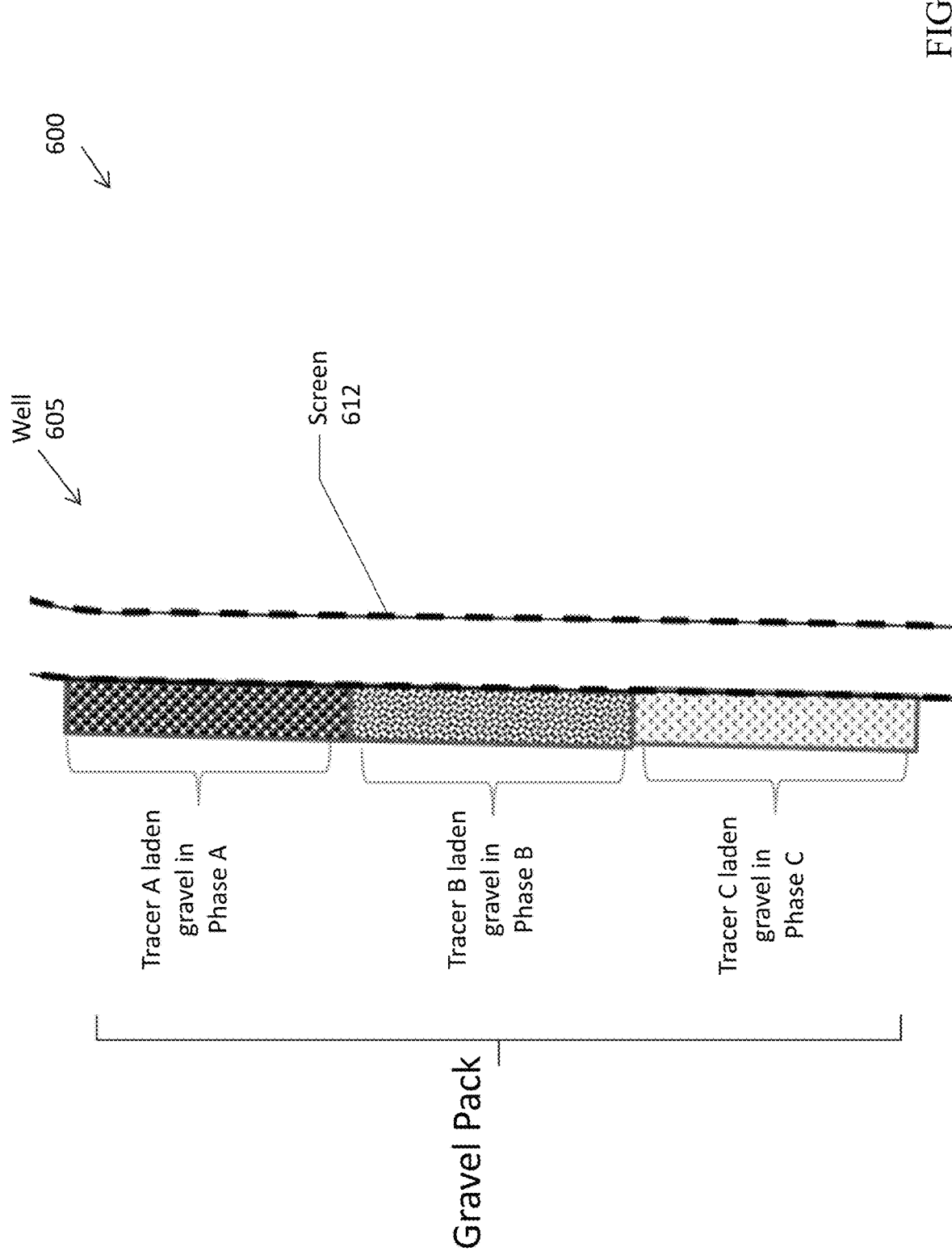
FIG. 6 illustrates a vertically oriented wellbore in which a series of distinct encapsulated tracer particles are deployed in a sequence of phases of a gravel pack along an interval length of the wellbore in accordance with an example embodiment of the disclosure.

Referring now to FIG. 6, a variation on the well system 500 of FIG. 5 is illustrated. FIG. 6 shows a cross-section of a well system 600 comprising an open hole well 605. In contrast to well system 500 of FIG. 5, well system 600 of FIG. 6 includes a vertical well portion in which a gravel pack has been placed. As illustrated in FIG. 6, the gravel pack is positioned around the outer side of a screen 612. Aside from the vertical orientation, the gravel pack of well system 600 is similar to the gravel pack of well system 500. That is, the gravel pack of well system 600 comprises phase A containing gravel laden with encapsulated tracer particles A, phase B containing gravel laden with encapsulated tracer particles B, and phase C containing gravel laden with encapsulated tracer particles C. Similar to the description of FIG. 5, when an acid stimulation operation is performed on well system 600, the concentration level of tracers A, B, and C in the retrieved fluid can indicate the extent of acid penetration at the different phases of the gravel pack.

For any figure shown and described herein, one or more of the components may be omitted, added, repeated, and/or substituted. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

With respect to the example methods described herein, it should be understood that in alternate embodiments, certain steps of the methods may be performed in a different order, may be performed in parallel, or may be omitted. Moreover, in alternate embodiments additional steps may be added to the example methods described herein. Accordingly, the example methods provided herein should be viewed as illustrative and not limiting of the disclosure.

Terms such as "first", "second", "top", "bottom", "side", "distal", "proximal", and "within" are used merely to distinguish one step or component from another. Such terms are not meant to denote a preference or a particular orientation, and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The terms "a," "an," and "the" are intended to include plural alternatives, e.g., at least one. The terms "including", "with", and "having", as used herein, are defined as comprising (i.e., open language), unless specified otherwise.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Numerical end points of ranges disclosed herein are approximate, unless excluded by proviso.

Values, ranges, or features may be expressed herein as "about", from "about" one particular value, and/or to "about" another particular value. When such values, or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means ±20% of the stated value, ±15% of the stated value, ±10% of the stated value, ±5% of the stated value, ±3% of the stated value, or ±1% of the stated value.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A method of assessing an acid stimulation of a hydrocarbon well, the method comprising:

pumping a first fracturing slurry comprising first encapsulated tracer particles into a first annular pack of a first fracturing stage in the hydrocarbon well, wherein the first encapsulated tracer particles comprise a first tracer coated with calcium carbonate;

pumping a second fracturing slurry comprising second encapsulated tracer particles into a second annular pack of a second fracturing stage in the hydrocarbon well, wherein the second encapsulated tracer particles comprise a second tracer coated with calcium carbonate;

at a subsequent time after pumping the first fracturing slurry and the second fracturing slurry, pumping an acid solution into the hydrocarbon well; and measuring an amount of the first tracer and the second tracer in a produced fluid from the hydrocarbon well;

wherein the pumping an acid solution into the hydrocarbon well comprises an acid treatment for remedial stimulation of the hydrocarbon well when productivity of the hydrocarbon well has declined.

2. The method of claim 1, wherein the acid solution dissolves the calcium carbonate coating the first encapsulated tracer particles and the calcium carbonate coating the second encapsulated tracer particles.

3. The method of claim 1, wherein the first annular pack accesses a first zone of the hydrocarbon well and the second annular pack accesses a second zone of the hydrocarbon well.

4. The method of claim 1, wherein the first encapsulated tracer particles and the second encapsulated tracer particles have an average diameter greater than zero and less than 3 mm.

5. The method of claim 4, wherein the first fracturing slurry and the second fracturing slurry further comprise proppant particles having an average diameter greater than zero and less than 3 mm.

6. The method of claim 1, wherein the first encapsulated tracer particles and the second encapsulated tracer particles have an average diameter greater than zero and less than 1 mm.

7. The method of claim 6, wherein the first fracturing slurry and the second fracturing slurry further comprise proppant particles having an average diameter greater than zero and less than 1 mm.

8. The method of claim 1, wherein:

a concentration of the first encapsulated tracer particles as a percentage by weight of total solids in the first slurry is greater than 0% and less than 10%; and a concentration of the second encapsulated tracer particles as a percentage by weight of total solids in the second slurry is greater than 0% and less than 10%.

9. The method of claim 1 wherein the first annular pack is placed around a first sand control screen and the second annular pack is placed around a second sand control screen.

* * * * *